United States Patent
Nadgowda et al.

(10) Patent No.: US 11,500,980 B2
(45) Date of Patent: Nov. 15, 2022

(54) AUTOMATED AND AUDITABLE FRAMEWORK TO CONTROL SOFTWARE COMPONENT CHANGES IN AN APPLICATION BUILD PROCESS

(71) Applicant: International Business Machines Corporation, Armonk, NY (US)

(72) Inventors: Shripad Nadgowda, Elmsford, NY (US); James Doran, New Milford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 402 days.

(21) Appl. No.: 16/787,353

(22) Filed: Feb. 11, 2020

(65) Prior Publication Data

US 2021/0248228 A1   Aug. 12, 2021

(51) Int. Cl.
| | |
|---|---|
| *G06F 21/54* | (2013.01) |
| *G06F 8/71* | (2018.01) |
| *G06F 8/65* | (2018.01) |
| *G06F 21/57* | (2013.01) |

(52) U.S. Cl.
CPC .............. *G06F 21/54* (2013.01); *G06F 8/65* (2013.01); *G06F 8/71* (2013.01); *G06F 21/572* (2013.01)

(58) Field of Classification Search
CPC ... G06F 21/54; G06F 8/65; G06F 8/71; G06F 21/572
See application file for complete search history.

(56) References Cited

U.S. PATENT DOCUMENTS

| | | | |
|---|---|---|---|
| 5,870,611 | A | 2/1999 | London Shrader et al. |
| 7,428,726 | B1 * | 9/2008 | Cowan .................. G06F 11/368 717/121 |
| 8,020,173 | B2 | 9/2011 | Cook et al. |

(Continued)

FOREIGN PATENT DOCUMENTS

| | | |
|---|---|---|
| CN | 106227579 A | 12/2016 |
| CN | 109213518 A | 1/2019 |

(Continued)

OTHER PUBLICATIONS

Helix Core P4 Command Reference, Perforce Software (Year: 2019).*

(Continued)

*Primary Examiner* — Robert B Leung
*Assistant Examiner* — Bruce S Ashley
(74) *Attorney, Agent, or Firm* — Amin, Turocy & Watson, LLP

(57) ABSTRACT

Techniques regarding managing one or more software application build processes are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a control component that can execute a freeze algorithm that modifies an incorporation of a software artifact within a software application build set. The freeze algorithm can prevent implementation of a change to the software artifact by a version control program.

20 Claims, 12 Drawing Sheets

(56) References Cited

U.S. PATENT DOCUMENTS

| | | | |
|---|---|---|---|
| 10,237,118 B2 | 3/2019 | Du et al. | |
| 2003/0120688 A1* | 6/2003 | Hill | G06F 8/71 707/999.203 |
| 2005/0091259 A1 | 4/2005 | Parthasarathy et al. | |
| 2017/0169229 A1* | 6/2017 | Brucker | G06F 21/566 |
| 2018/0173510 A1* | 6/2018 | Koshkin | G06Q 10/06313 |

FOREIGN PATENT DOCUMENTS

| | | |
|---|---|---|
| CN | 109471658 A | 3/2019 |
| CN | 109947452 A | 6/2019 |

OTHER PUBLICATIONS

Mell, Peter, et al. "The NIST Definition of Cloud Computing." National Institute of Standards and Technology. Sep. 2011. 7 pages.

\* cited by examiner

FIG. 3

```
Test2 > Dockerfile > ...
1    FROM golang:1.10.0-alpine3.7
2    RUN apk add --update --no-cache \
3        git openssh yajl-dev zlib-dev nmap
4
5    RUN pip install pytz requests elasticsearch elasticsearch-dsl django==1.2
6
7    WORKDIR /go/src/github.com/mchmarny/simple-app/
8    COPY . .
```

```
Test2 > Dockerfile > ...
1    FROM golang:1.10.0-alpine3.7@sha256:abe234mkdjfladf2234
2    RUN apk add --update --no-cache \
3        git=1.4 openssh=3.2 yajl-dev=1.1.9 zlib-dev=2.0 nmap=9.12
4
5    RUN pip install pytz==1.3.4 requests==1.1.1 elasticsearch==2.2 elasticsearch-dsl==2.2 django==1.2
6
7    WORKDIR /go/src/github.com/mchmarny/simple-app/
8    COPY . .
```

AUTOMATED AND AUDITABLE FRAMEWORK TO CONTROL SOFTWARE COMPONENT CHANGES IN AN APPLICATION BUILD PROCESS

BACKGROUND

The subject disclosure relates to one or more automated and/or auditable frameworks to control one or more software component changes in an application build process, and more specifically, to preventing unauthorized changes from being embedded into one or more software application build processes.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can regard controlling one or more software component changes in a software application build process are described.

According to an embodiment, a system is provided. The system can comprise a memory that can store computer executable components. The system can also comprise a processor, operably coupled to the memory, that can execute the computer executable components stored in the memory. The computer executable components can comprise a control component that can execute a freeze algorithm that modifies an incorporation of a software artifact within a software application build set. The freeze algorithm can prevent implementation of a change to the software artifact by a version control program.

According to an embodiment, a computer-implemented method is provided. The computer-implemented method can comprise executing, by a system operatively coupled to a processor, a freeze algorithm that modifies an incorporation of a software artifact within a software application build set. The freeze algorithm can prevent implementation of a change to the software artifact by a version control program.

According to an embodiment, a computer program product for preventing unauthorized packages from being embedded into a software application build process is provided. The computer program product can comprise a computer readable storage medium having program instructions embodied therewith. The program instructions can be executable by a processor to cause the processor to execute, by the processor, a freeze algorithm that modifies an incorporation of a software artifact within a software application build set. The freeze algorithm can prevent implementation of a change to the software artifact by a version control program.

BRIEF DESCRIPTION OF THE DRAWINGS

FIG. 3 illustrates a diagram of example, non-limiting freeze algorithms that can be implemented to prevent one or more unauthorized changes to an application build set in accordance with one or more embodiments described herein.

DETAILED DESCRIPTION

Figure 1:
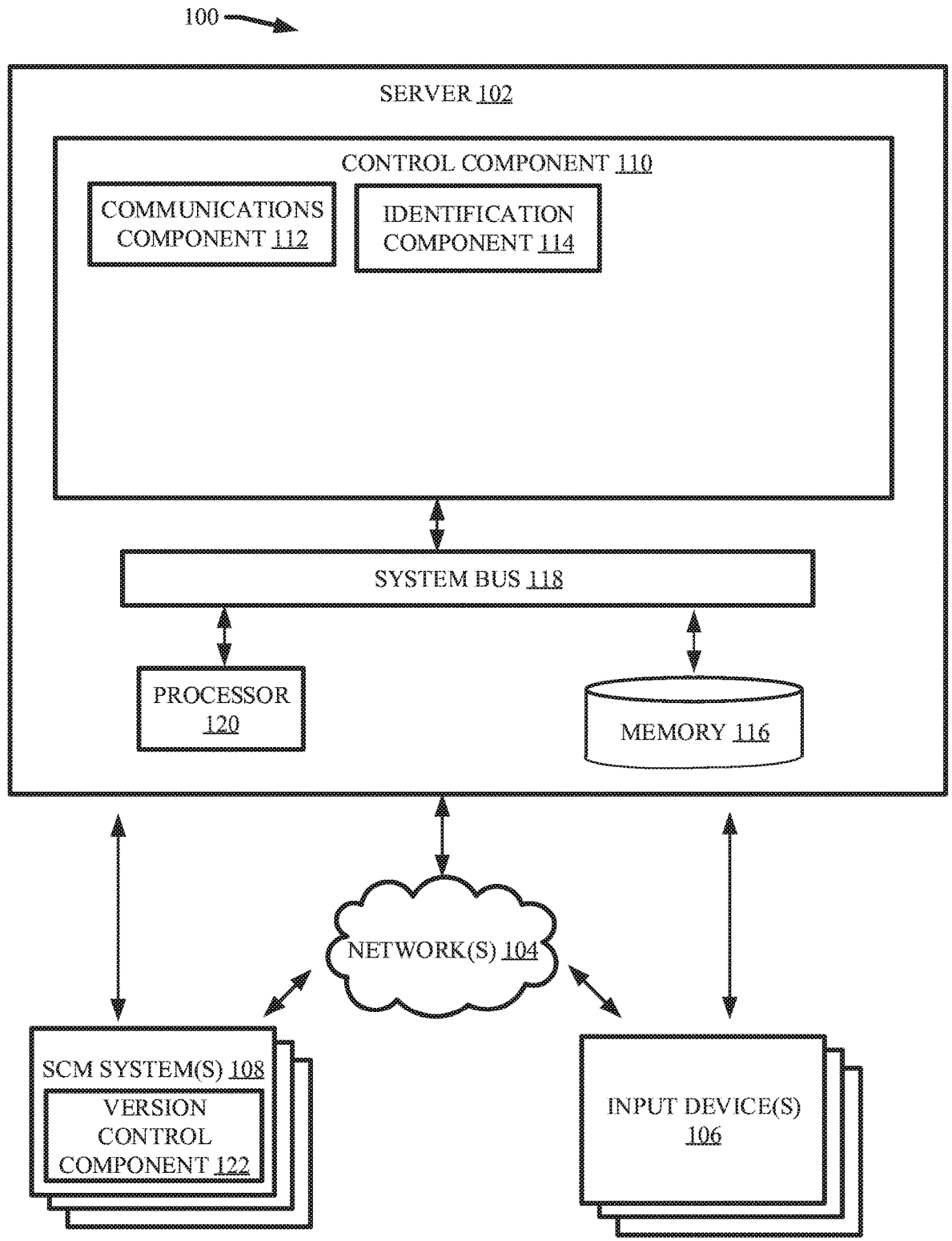
FIG. 1 illustrates a block diagram of an example, non-limiting system that can identify one or more software artifacts comprised within a software application build set in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Conventional software application build sets utilize software artifacts as building assets for the development of computer program applications (e.g., such as microservice applications). The software artifacts can often be sourced from one or more SCM systems, which can intermittently implement changes to the software artifacts (e.g., such as updates generated by one or more version control programs). Thereby, the software artifact changes are automatically incorporated into the software application build set, resulting in one or more variations of the software application build set despite a lack of change in the application code and/or lack of authorization.

Various embodiments of the present invention can be directed to computer processing systems, computer-implemented methods, apparatus and/or computer program products that facilitate the efficient, effective, and autonomous (e.g., without direct human guidance) control of software artifact changes during one or more software application build processes. For example, one or more embodiments described herein can comprise freezing one or more software artifacts to prevent implementation of a change to a software application build set by one or more version control programs. One or more embodiments can further include monitoring one or more sources of the software artifact (e.g., one or more source code management ("SCM") systems) to detect the changes generated by the one or more version control programs (e.g., to detect one or more version updates associated with the frozen software artifacts). Additionally, one or more embodiments can comprise analyzing the software artifacts and/or the changes generated by the version control program to create one or more audit logs regarding one or more software vulnerabilities, such as security requirements and/or compliance requirements. Moreover, various embodiments can comprise integrating the change into the software application build set based on the one or more audit logs.

The computer processing systems, computer-implemented methods, apparatus and/or computer program products employ hardware and/or software to solve problems that are highly technical in nature (e.g., controlling one or more software application build processes), that are not abstract and cannot be performed as a set of mental acts by a human. For example, an individual, or a plurality of individuals, cannot freeze one or more build artifacts while monitoring various version control systems in an attempt to maintain up-to-date audit logs regarding available changes to the artifacts. For instance, version updates to software artifacts are often implemented by SCM systems automatically without the knowledge and/or authorization of developers, thereby preventing human software developers from performing the auto-remediation exhibited by various embodiments described herein.

Also, one or more embodiments described herein can constitute a technical improvement over conventional software application build processes by preventing unauthorized changes from being embedded into one or more software application (e.g., microservice application) build processes (e.g., via execution of one or more freeze algorithms that modify software artifacts that can be build assets for the software application). Additionally, various embodiments described herein can demonstrate a technical improvement over conventional software application build processes by providing an auditable framework to incorporate changes to the software application build set. For example, various embodiments described result in greater efficiency of operation and greater security of the system by preventing changes generated by sources of the software artifacts (e.g., SCM systems and/or version control programs) from automatically being integrated into the given application build set. Further, one or more embodiments described herein can have a practical application by ensuring that software component changes are not introduced into a software application without security and/or compliance verification; while also providing a controlled, automated, and/or auditable framework to implement new changes to the software application build set. For instance, various embodiments described herein can be applied to a software application undergoing A/B testing such that updates to one or more software artifacts are not automatically introduced to one version of the application and not another, which would inherently compromise the test. One or more embodiments described herein can control one or more software development platforms such that software artifact updates can be analyzed and/or audited in reference to various security requirements in order to receive authorization to be integrated into the application build process. For example, a control component can generate a signal that controls a software development platform to execute one or more freeze algorithms that can prevent changes generated by sources of the software artifacts (e.g., SCM systems and/or version control programs) from automatically integrating into the given application build set based on one or more security and/or compliance verifications performed as part of the software build process.

FIG. 1 illustrates a block diagram of an example, non-limiting system 100 that can control one or more software artifact changes during one or more software application build processes. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, etc.), can cause the machines to perform the operations described.

As shown in FIG. 1, the system 100 can comprise one or more servers 102, one or more networks 104, input devices 106, and/or SCM systems 108. The server 102 can comprise control component 110. The control component 110 can further comprise communications component 112 and/or identification component 114. Also, the server 102 can comprise or otherwise be associated with at least one memory 116. The server 102 can further comprise a system bus 118 that can couple to various components such as, but not limited to, the control component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or SCM systems 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the control component 110 can be provided on the one or more servers 102, it should be appreciated that the architecture of system 100 is not so limited. For example, the control component 110, or one or more components of control component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more software application build sets into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In various embodiments, the one or more software application build sets can comprise one or more build artifacts utilized to develop a computer program application (e.g., a microservice application). For example, the one or more software application build sets can include, but is not limited to: application codes, Dockerfiles, application images, base images, Makefiles, requirement.txt files, package-lock.json files, software packages, a combination thereof, and/or the like. In one or more the control component 110 can modify and/or build upon the one or more software application (e.g., microservice application) build sets during an application build process.

In one or more embodiments, the one or more software application build sets can comprise one or more build artifacts sourced from one or more SCM systems 108. The one or more SCM systems 108 can comprise, for example: image registries, package registries, software development platforms, container orchestration systems, a combination thereof, and/or the like. For instance, the one or more SCM systems 108 can comprise one or more image registries that can provide one or more base image artifacts and/or application image artifacts comprised within the software application build set. In another instance, the one or more SCM systems 108 can comprise one or more package repositories that can provide one or more application package artifacts and/or container artifacts comprised within the software application build set. In a further instance, the one or more SCM systems 108 can comprise one or more software development platforms that can provide support for one or more of the software artifacts.

In various embodiments, the one or more SCM systems 108 can further comprise one or more version control components 122 that can execute one or more version control programs to generate one or more changes to the sourced software artifacts. For example, the one or more version control programs can coordinate updates to one or more of the software artifacts. For instance, the updates can regard the performance of the one or more software artifacts and/or one or more exposed vulnerabilities in the one or more software artifacts. The one or more changes implemented by the version control programs can be generated periodically and/or intermittently at the discretion of the one or more SCM systems 108.

In one or more embodiments, the identification component 114 can analyze the one or more software application build sets and identify the one or more build artifacts. Further, the identification component 114 can parse the build artifacts into one or more bill-of-material lists. The one or more bill-of-material lists can include each build artifact comprised within the software application build set, the source of each build artifact (e.g., SCM systems 108 associated with respective build artifacts), dependencies of the build artifacts, a combination thereof, and/or the like. In various embodiments, the identification component 114 can store the one or more bill-of-material lists in the one or more memories 116. For example, in one or more embodiments the identification component 114 can store the one or more bill-of-material lists as a graph database within the one or more memories 116.

Figure 2:
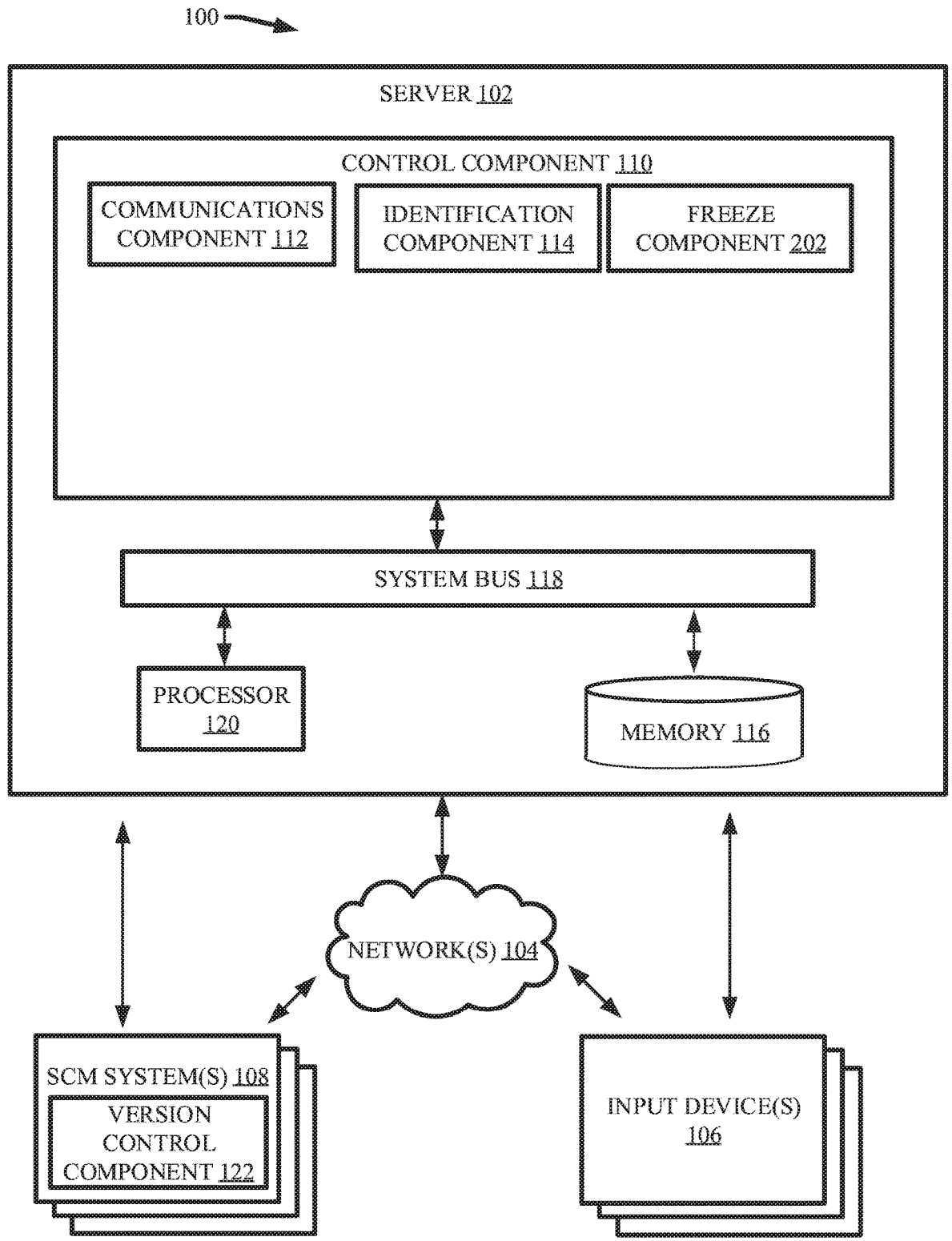
FIG. 2 illustrates a block diagram of an example, non-limiting system that can prevent one or more changes in the software artifacts of a software application build set in accordance with one or more embodiments described herein.

FIG. 2 illustrates a diagram of the example, non-limiting system 100 further comprising freeze component 202 in accordance with one or more embodiments described herein. Repetitive description of like elements employed in other embodiments described herein is omitted for sake of brevity. In various embodiments, the freeze component 202 can execute one or more freeze algorithms to prevent implementation of one or more changes to one or more of the identified build artifacts by one or more SCM systems 108 (e.g., one or more version control programs).

In one or more embodiments, the freeze component 202 can execute one or more freeze algorithms to adapt the one or more identified build artifacts such that changes to the artifacts (e.g., updates by one or more version control programs) are not implemented without authorization by the control component 110. The type of functions of freeze algorithm implemented by the freeze component 202 can vary based on the type of build artifact being frozen. Example types of functions that can be performed by the one or more freeze algorithms and/or implemented by the freeze component 202 to adapt the one or more identified build artifacts can include, but are not limited to: incorporating one or more hash functions (e.g., sha-256), pinning one or more versions of the given build artifact, incorporating one or more Boolean expressions (e.g., a comparison operator), a combination thereof, and/or the like.

In various embodiments, the one or more freeze algorithms can execute preferred functions stored in the one or more memories 116 and/or entered into the system 100 via the one or more input devices 106 and/or networks 104. For example, one or more preferred functions can define one or more versions to pin to an operating system artifact and/or one or more hash functions to incorporate with base images.

FIG. 3 illustrates a diagram of an example, non-limiting build set 300 that can be controlled by the control component 110 in accordance with one or more embodiments described herein. Repetitive description of like elements employed in other embodiments described herein is omitted for sake of brevity. As shown in FIG. 3, the example build set 300 can include the following build artifacts, which can be identified and/or parsed into a bill-of-material list by the identification component 114: a base image (e.g., depicted on line 1 of the build set 300), an operating system package (e.g., depicted on lines 2-3 of the build set 300), a pattern package (e.g., depicted on line 5 of the build set 300), and/or Dockerfile (e.g., depicted on line 7 of the build set 300).

The top version of the example build set 300 depicted in FIG. 3 can depict the build set 300 prior to execution of one or more freeze algorithms by the freeze component 202. The bottom version of the example build set 300 depicted in FIG. 3 can depict the build set 300 subsequent to execution of one or more freeze algorithms by the freeze component 202. As shown in FIG. 3, the freeze component 202 can execute a freeze algorithm to freeze the exemplary base image artifact by incorporating a sha-256 hash function into line 1 of the build set 300. Also shown in FIG. 3, the freeze component 202 can execute a freeze algorithm to freeze the operating system artifact by pinning a defined version of the operating system in line 3 of the build set 300 (e.g., the latest version of the operating system at the time of analysis by the freeze component 202, and/or a preferred version). Further, the freeze component 202 can execute a freeze algorithm to freeze the pattern package artifact by incorporating a comparison operator (e.g., double equal sign) Boolean expression into line 5 of the build set 300. Thereby, the freeze component 202 can execute the one or more freeze algorithms to adapt the build set 300 to inhibit changes to one or more of the identified build artifacts.

Figure 4:
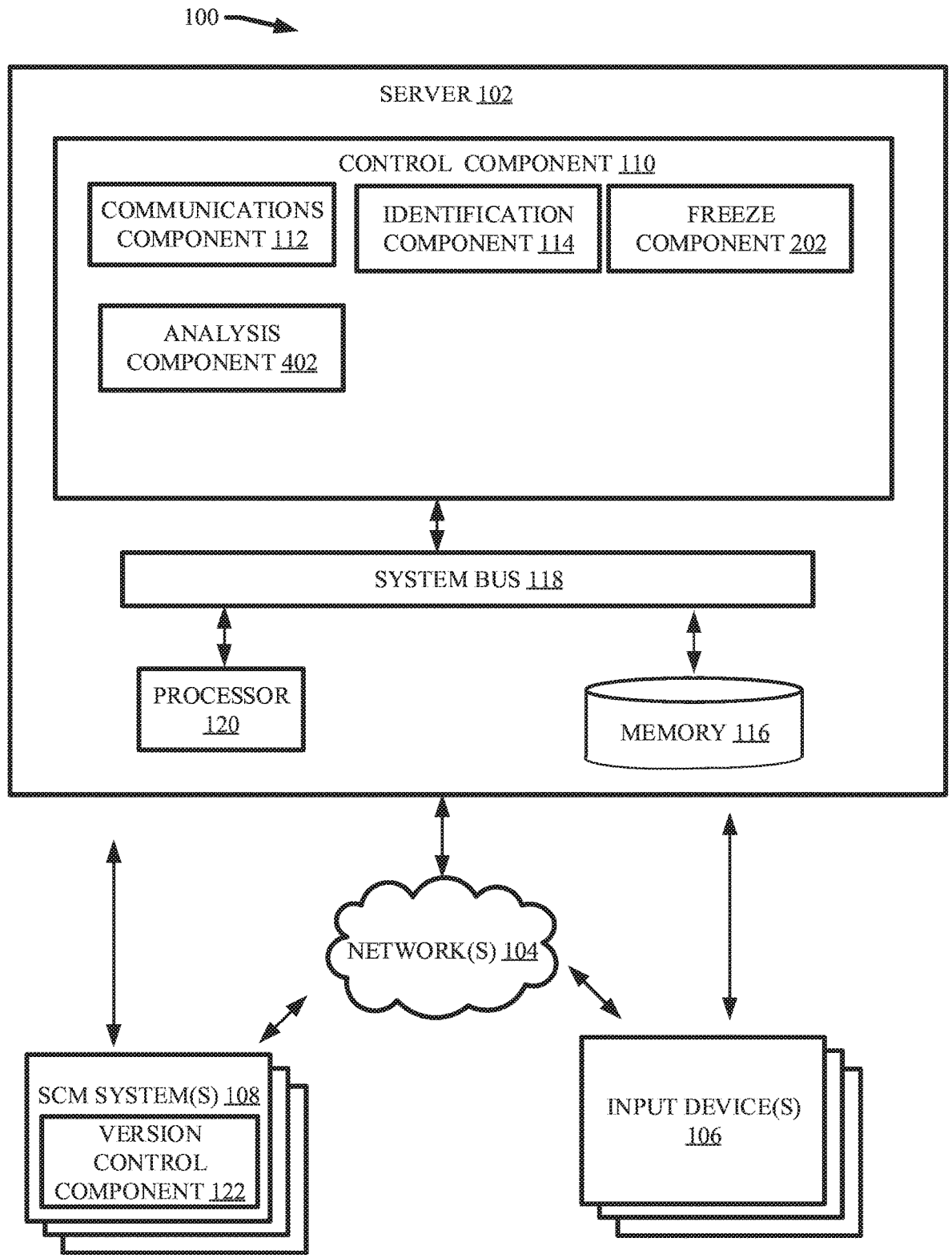
FIG. 4 illustrates a block diagram of an example, non-limiting system that can evaluate one or more software artifacts based on one or more security and/or compliance requirements in accordance with one or more embodiments described herein.

FIG. 4 illustrates a diagram of the example, non-limiting system 100 further comprising analysis component 402 in accordance with one or more embodiments described herein. Repetitive description of like elements employed in other embodiments described herein is omitted for sake of brevity. In various embodiments, the analysis component 402 that can evaluate the one or more identified and/or frozen build artifacts based on one or more security and/or compliance requirements.

In one or more embodiments, the analysis components 402 can evaluate one or more build artifacts from the software application build set based on the identifications and/or bill-of-materials lists performed by the identification component 114. Additionally, in various embodiments the analysis component 402 can evaluate one or more build artifacts from the software application build set based on execution of freeze algorithms by the freeze component 202.

In one or more embodiments, one or more security requirement datasets can be stored in the one or more memories 116. The security requirement datasets can delineate one or more security thresholds associated with various build artifacts. For example, the one or more security thresholds can delineate a level of encryption, confidentiality, redundancies, a combination thereof, and/or the like to be exhibited by respective build artifacts. The analysis component 402 can compare the characteristics of the one or more identified and/or frozen build artifacts with the security requirement datasets to determine whether the build artifacts meet the defined security requirements. Wherein a build artifact fails to meet one or more of the security requirement thresholds, the analysis component 402 can identify the given build artifact and/or the respective security requirement threshold as a potential vulnerability in the software application build set.

In one or more embodiments, one or more compliance requirement datasets can be stored in the one or more memories 116. The compliance requirement datasets can delineate one or more compliance thresholds associated with various build artifacts. For example, the one or more compliance thresholds can delineate one or more preferred functions, formats, means of operation, confidentiality requirements, a combination thereof, and/or the like to be exhibited by respective build artifacts. The analysis component 402 can compare the characteristics of the one or more identified and/or frozen build artifacts with the compliance requirement datasets to determine whether the build artifacts meet the defined compliance requirements. Wherein a build artifact fails to meet one or more of the compliance requirement thresholds, the analysis component 402 can identify the given build artifact and/or the respective compliance requirement threshold as a potential vulnerability in the software application build set.

In various embodiments, the analysis component 402 can further identify the one or more potential vulnerabilities in relation to the build artifacts and/or display the one or more potential vulnerabilities and/or build artifacts via the one or more input devices 106 and/or networks 104. Based on a potential vulnerability in the software application build set being identified, the analysis component 402 can further identify the one or more build artifacts that are the source of the vulnerability. For example, wherein a build artifact fails to meet the one or more security and/or compliance requirement thresholds, the analysis component 402 can identify the given build artifact as a source of a vulnerability associated with given security and/or compliance requirement thresholds. Thereby, one or more build artifacts, security requirement thresholds, and/or compliance requirement thresholds can be identified along with the potential vulnerabilities. Additionally, in one or more embodiments, the analysis component 402 can communicate (e.g., via the communications component 112 and/or one or more networks 104) with one or more external security and/or compliance monitoring systems to receive updates regarding newly discovered vulnerabilities.

Figure 5:
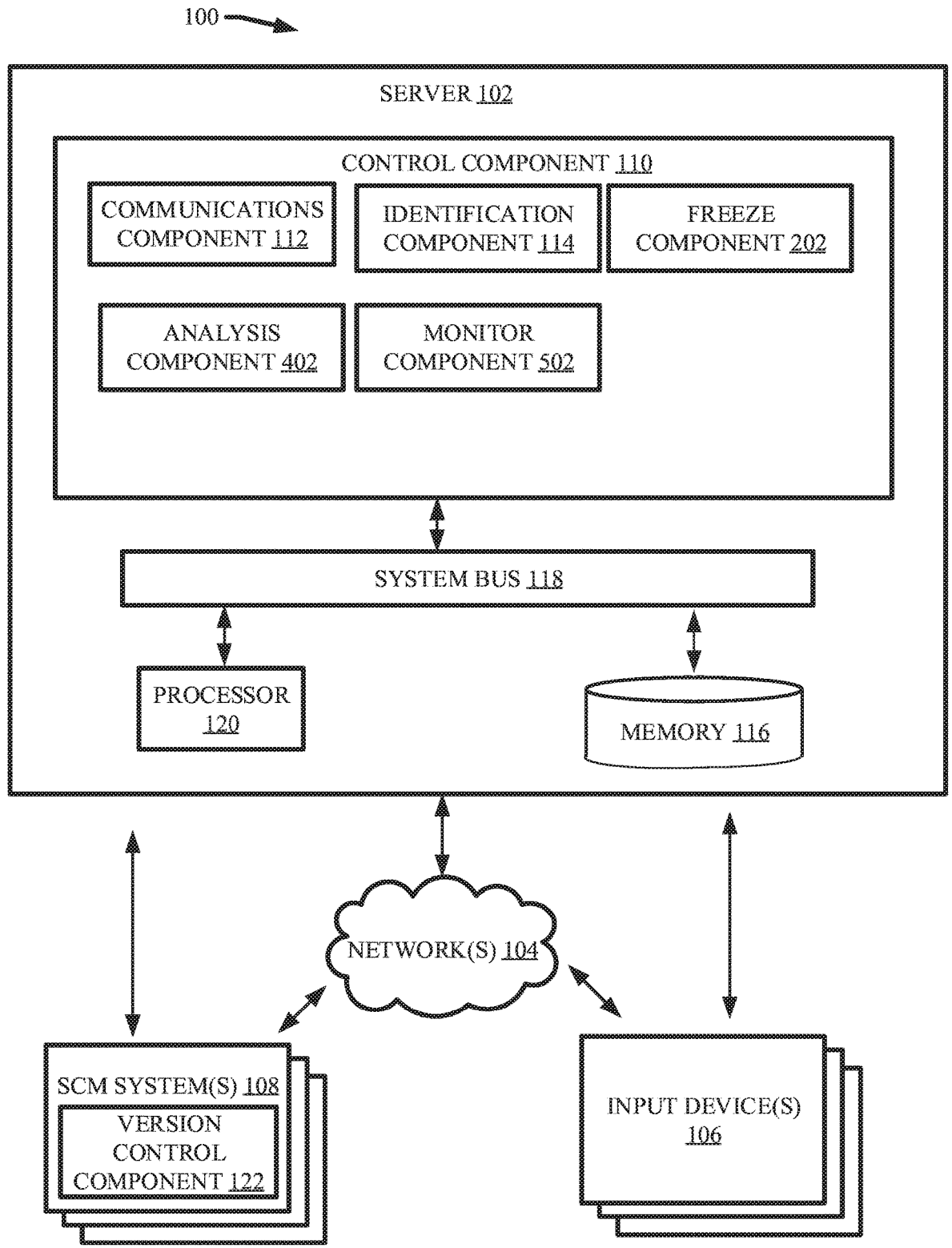
FIG. 5 illustrates a block diagram of an example, non-limiting system that can monitor one or more source code management ("SCM") systems to detect changes directed towards software artifacts of a software application build set in accordance with one or more embodiments described herein.

FIG. 5 illustrates a diagram of the example, non-limiting system 100 further comprising monitor component 502 in accordance with one or more embodiments described herein. Repetitive description of like elements employed in other embodiments described herein is omitted for sake of brevity. In various embodiments, the monitor component 502 can monitor the one or more SCM systems 108 to detect possible changes to the one or more identified and/or frozen build artifacts.

In one or more embodiments, the monitor component 502 can monitor the one or more SCM systems 108 to determine if any changes have been issued regarding one or more of the build artifacts. For example, the monitor component 502 can detect when one or more new versions of the one or more of build artifacts are generated by a version control program. Further, in various embodiments the monitor component 502 can determine whether the one or more detected changes (e.g., version updates) address one or more of the vulnerabilities identified by the analysis component 402. For example, the monitor component 502 can determine whether the one or more detected changes regard the one or more security requirement thresholds, compliance requirement thresholds, and/or build artifacts associated with a vulnerability identified by the analysis component 402. Thereby, the monitor component 502 can establish a framework that can detect newly generated and/or discovered changes to one or more of the build artifacts that can be available for integration into the software application build set.

Figure 6:
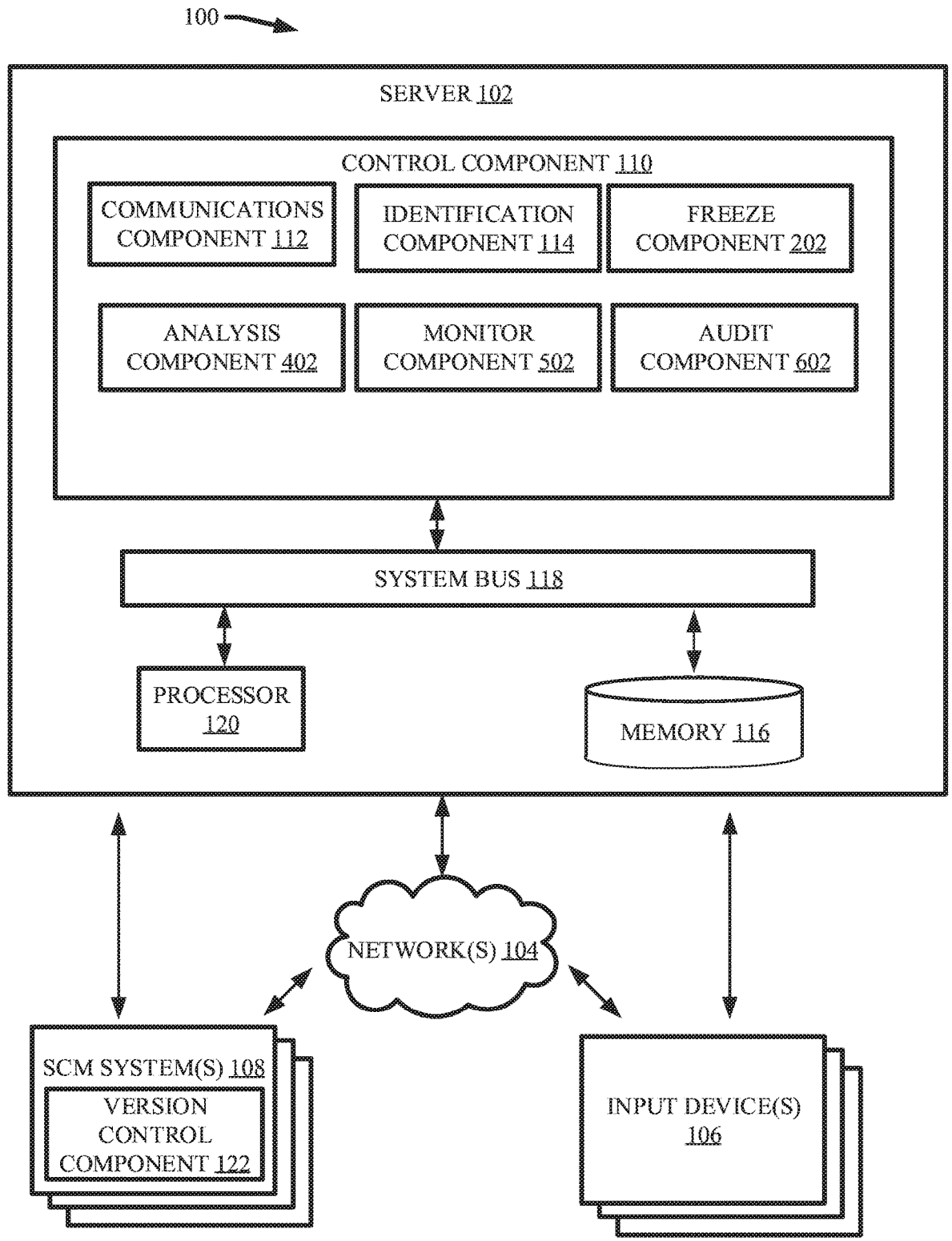
FIG. 6 illustrates a block diagram of an example, non-limiting system that can generate one or more audit logs regarding possible changes to software artifacts generated by one or more SCM systems in accordance with one or more embodiments described herein.

FIG. 6 illustrates a diagram of the example, non-limiting system 100 further comprising audit component 602 in accordance with one or more embodiments described herein. Repetitive description of like elements employed in other embodiments described herein is omitted for sake of brevity. In various embodiments, the audit component 602 can generate one or more audit logs based on whether the detected changes (e.g., by the monitor component 502) address a vulnerability in the one or more build artifacts.

In one or more embodiments, the one or audit logs can include, but are not limited to: characteristics of the one or more build artifacts in their current state (e.g., the current version of the build artifacts being implemented by the software application build set), vulnerabilities associated with the one or more build artifacts, available changes to the one or more build artifacts (e.g., version updates), timestamps regarding when the changes are made available, indications of whether the available changes address one or more of the vulnerabilities, a combination thereof, and/or the like. In various embodiments, the audit component 602 can store the one or more audit logs in the one or more memories 116 and/or can present the audit logs via the one or more input devices 106 and/or networks 104. Further, in various embodiments the audit component 602 can generate the one or more audit logs in response to generation of the bill-of-material lists by the identification component 114 and/or execution of the freeze algorithms by the freeze component 202. Additionally, the audit component 602 can update the one or more audit logs in response to one or more vulnerabilities being identified by the analysis component 402 and/or one or more potential artifact changes being made available and detected by the monitor component 502.

Figure 7:
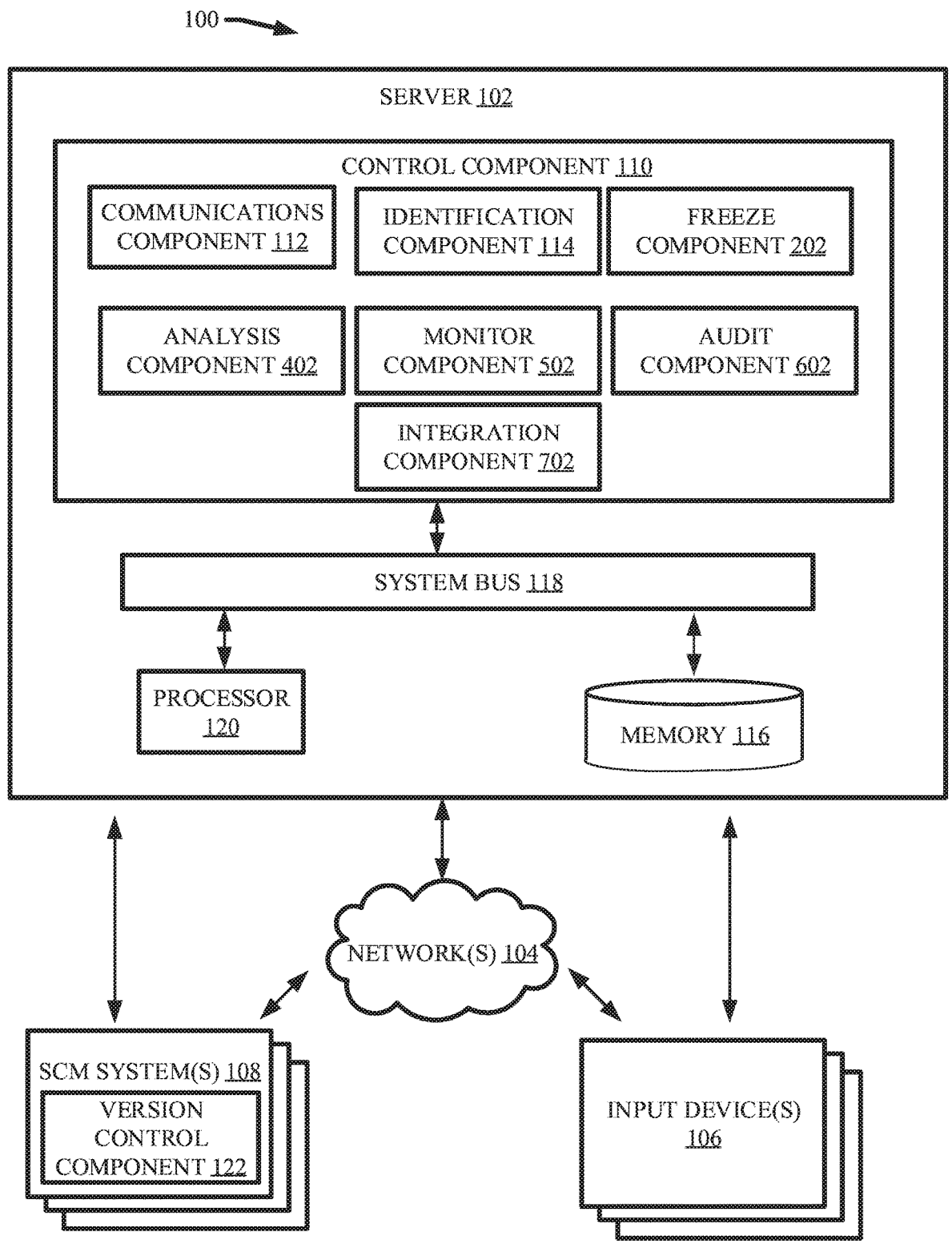
FIG. 7 illustrates a block diagram of an example, non-limiting system that can integrate one or more software artifact changes into a software application build set based on an audit of the changes in accordance with one or more embodiments described herein.

FIG. 7 illustrates a diagram of the example, non-limiting system 100 further comprising integration component 702 in accordance with one or more embodiments described herein. Repetitive description of like elements employed in other embodiments described herein is omitted for sake of brevity. In various embodiments, the integration component 702 can integrate the one or more detected changes to the build artifacts into the software application build set based on the audit log.

In one or more embodiments, the integration component 702 can implement one or more available changes to one or more build artifacts of the software application build set based on a determination from the one or more audit logs that the one or more available changes address one or more vulnerabilities of the build artifacts. In various embodiments, the change integration can be performed autonomously by the integration component 702. Additionally, the integration component 702 can analyze the one or more audit logs continuously or periodically to identify an artifact change (e.g., an update) to be integrated into the software application build set. For instance, one or more integration schedules can be defined (e.g., via the one or more input devices 106 and/or networks 104) and/or stored within the one or more memories 116, wherein the one or more integration schedules that can delineate when and/or how often the integration component 702 can assess the audit logs and/or integrate artifact changes. Thereby, in various embodiments the integration component 702 can perform an auto-remediation of the software application build set to address one or more vulnerabilities based on customizable settings delineated by security and/or compliance requirements (e.g., which can be defined by one or more security systems, compliance systems, and/or artificial intelligence systems via the one or more security requirement and/or compliance requirement datasets).

In various embodiments, the integration component 702 can perform one or more artifact change integrations based on one or more commands by one or more developers of the software application build set. For example, the audit component 602 can present the one or more audit logs to the one or more developers (e.g., via the one or more input devices 106 and/or networks 104), whereupon the developers can conduct a personalized assessment and determine whether the integration component 702 can integrate one or more available artifact changes into the software application build set.

Additionally, the audit component 602 can update the audit logs to reflect integrated changes in response to the integration component 702 integrating one or more available artifact changes into the software application build set. Further, the freeze component 202 can execute one or more freeze algorithms on the altered build artifact so as to prevent further changes from being implemented outside instruction by the integration component 702. Thereby, the control component 110 can control the state of various build artifacts within the software application build set such that changes to the artifacts (e.g., version updates) can be regulated to changes authorized by the integration component 702 based on the given build artifacts, security and/or compliance characteristics of the build artifacts, vulnerabilities of the build artifacts, artifact changes available for integration, and/or defined preferences.

Figure 8:
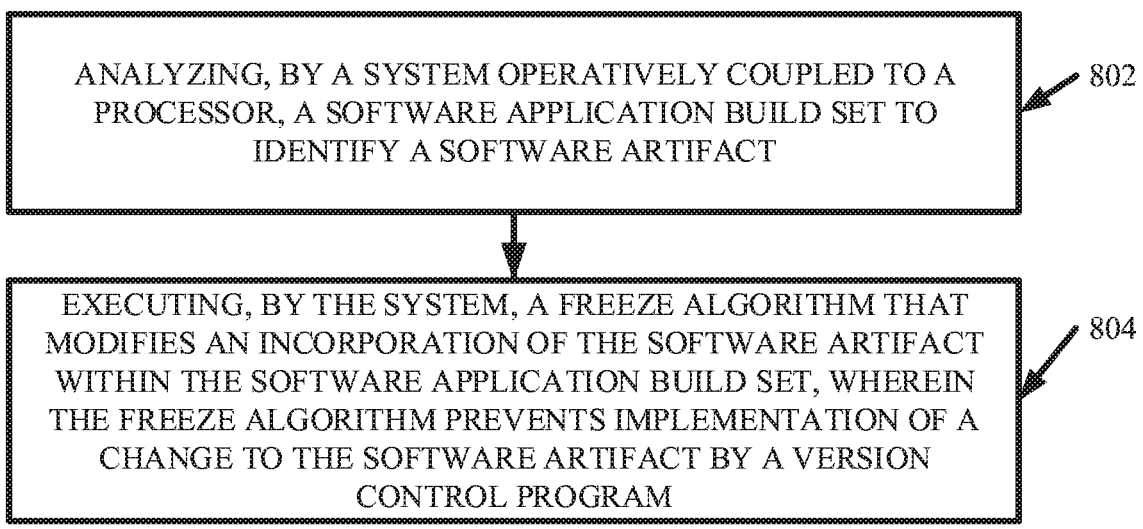
FIG. 8 illustrates a flow diagram of an example, non-limiting computer-implemented method that can facilitate managing one or more software application build processes in accordance with one or more embodiments described herein.

FIG. 8 illustrates a flow diagram of an example, non-limiting computer-implemented method 800 that can facilitate managing one or more software application build processes in accordance with one or more embodiments described herein. Repetitive description of like elements employed in other embodiments described herein is omitted for sake of brevity.

At 802, the method 800 can comprise analyzing (e.g., via identification component 114), by a system 100 operatively coupled to a processor 120, one or more software application build sets to identify one or more software artifacts. For example, the one or more software artifacts can include one or more software components utilized to build the given software application (e.g., microservice application).

At 804, the method 800 can comprise executing (e.g., via freeze component 202), by a system 100 operatively coupled to a processor 120, one or more freeze algorithms that can modify an incorporation of the one or more software artifacts within the software application build set, wherein the freeze algorithm can prevent implementation of a change to the software artifact by a version control program. For example, the one or more software artifacts identified at 802 can be sourced from one or more SCM systems 108, which can comprise one or more version control components 122 that can implement the one or more version control programs and provide updates to the software artifacts.

The one or more freezing algorithms executed at 804 can prevent the one or more changes (e.g., version updates) from being implemented on the identified software artifacts. As described in various embodiments herein, example functions performed by the one or more freeze algorithms can include, but are not limited to: incorporating one or more hash functions (e.g., sha-256), pinning one or more versions of the given build artifact, incorporating one or more Boolean expressions (e.g., a comparison operator), a combination thereof, and/or the like. In various embodiments, the type of freeze mechanism executed can be dependent on the type of software artifact. By executing the one or more freezing algorithms, the method 800 can prevent one or more unauthorized changes to alter the software application build set during development of the software application.

Figure 9:
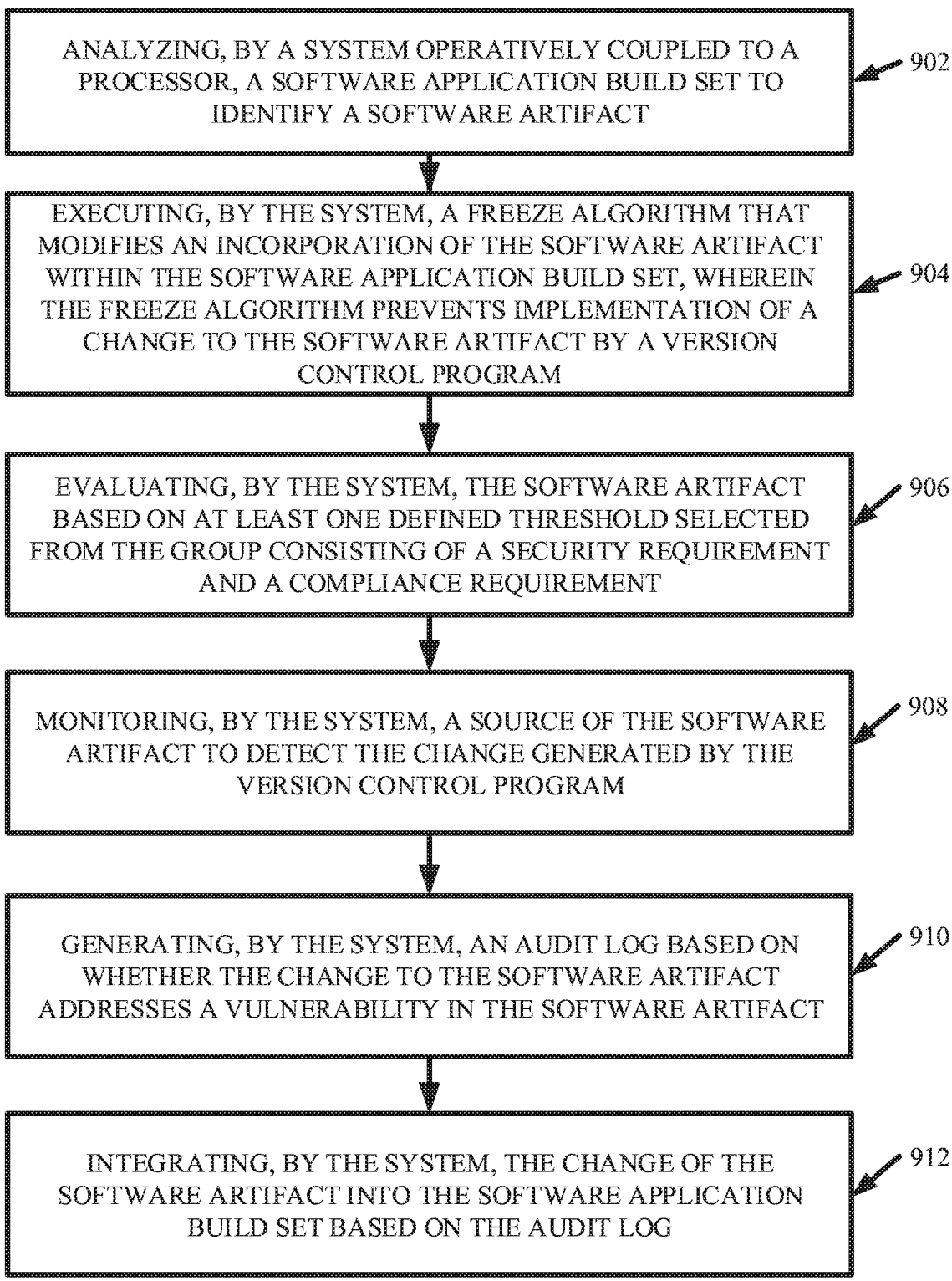
FIG. 9 illustrates a flow diagram of an example, non-limiting computer-implemented method that can facilitate managing one or more software application build processes in accordance with one or more embodiments described herein.

FIG. 9 illustrates a flow diagram of an example, non-limiting computer-implemented method 900 that can facilitate managing one or more software application build processes in accordance with one or more embodiments described herein. Repetitive description of like elements employed in other embodiments described herein is omitted for sake of brevity.

At 902, the method 900 can comprise analyzing (e.g., via identification component 114), by a system 100 operatively coupled to a processor 120, one or more software application build sets to identify one or more software artifacts. For example, the one or more software artifacts can include one or more software components utilized to build the given software application (e.g., microservice application).

At 904, the method 900 can comprise executing (e.g., via freeze component 202), by a system 100 operatively coupled to a processor 120, one or more freeze algorithms that can modify an incorporation of the one or more software artifacts within the software application build set, wherein a freeze algorithm can prevent implementation of a change to the software artifact by a version control program. For example, the one or more software artifacts identified at 902 can be sourced from one or more SCM systems 108, which can comprise one or more version control components 120 that can implement the one or more version control programs and provide updates to the software artifacts.

The one or more freezing algorithms executed at 904 can prevent the one or more changes (e.g., version updates) from being implemented on the identified software artifacts. As described in various embodiments herein, example functions that can be performed by the one or more freeze algorithms can include, but are not limited to: incorporating one or more hash functions (e.g., sha-256), pinning one or more versions of the given build artifact, incorporating one or more Boolean expressions (e.g., a comparison operator), a combination thereof, and/or the like. In various embodiments, the type of functions performed by the freeze algorithm executed can be dependent on the type of software artifact.

At 906, the method 900 can comprise evaluating (e.g., via analysis component 402), by the system 100, the one or more software artifacts based on at least one defined threshold selected from the group consisting of a security requirement and/or a compliance requirement. For example, the evaluating at 906 can comprise comparing one or more characteristics of the identified and/or frozen software artifacts to one or more thresholds comprised within one or more security requirement datasets and/or compliance requirement datasets in accordance with one or more embodiments described herein.

At 908, the method 900 can comprise monitoring (e.g., via monitor component 502), by the system 100, one or more sources of the identified and/or frozen software artifacts to detect the one or more changes generated by the one or more version control program. For example, the monitoring at 908 can comprise detecting one or more available changes to the software artifacts (e.g., version updates) and/or determining whether the available changes regard one or more of the security requirements and/or compliance requirements. For instance, the method 900 can comprise monitoring or more SCM systems 108 to detect version updates to one or more of the software artifacts.

At 910, the method 900 can comprise generating (e.g., via audit component 602), by the system 100, one or more audit logs based on whether the change to the one or more software artifacts addresses a vulnerability in the software artifact. Example information that can be included in the one or more audit logs can include, but are not limited to: characteristics of the one or more build artifacts in their current state (e.g., the current version of the build artifacts being implemented by the software application build set), vulnerabilities associated with the one or more build artifacts, available changes to the one or more build artifacts (e.g., version updates), timestamps regarding when the changes are made available, indications of whether the available changes address one or more of the vulnerabilities, a combination thereof, and/or the like.

At 912, the method 900 can comprise integrating (e.g., via integration component 702), by the system 100, the one or more detected changes of the software artifact into the software application build set based on the one or more audit logs. In one or more embodiments, the integrating at 912 can be based on a determination from the audit logs that the one or more available changes to the software artifacts address one or more vulnerabilities in the software application build set with regards to one or more of the security requirements and/or compliance requirements.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
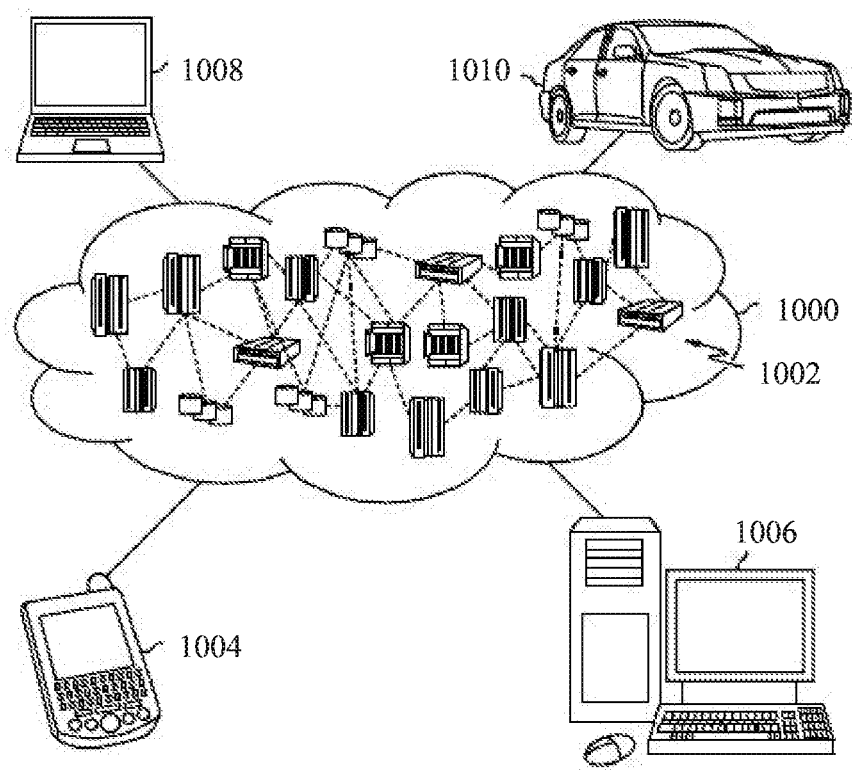
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
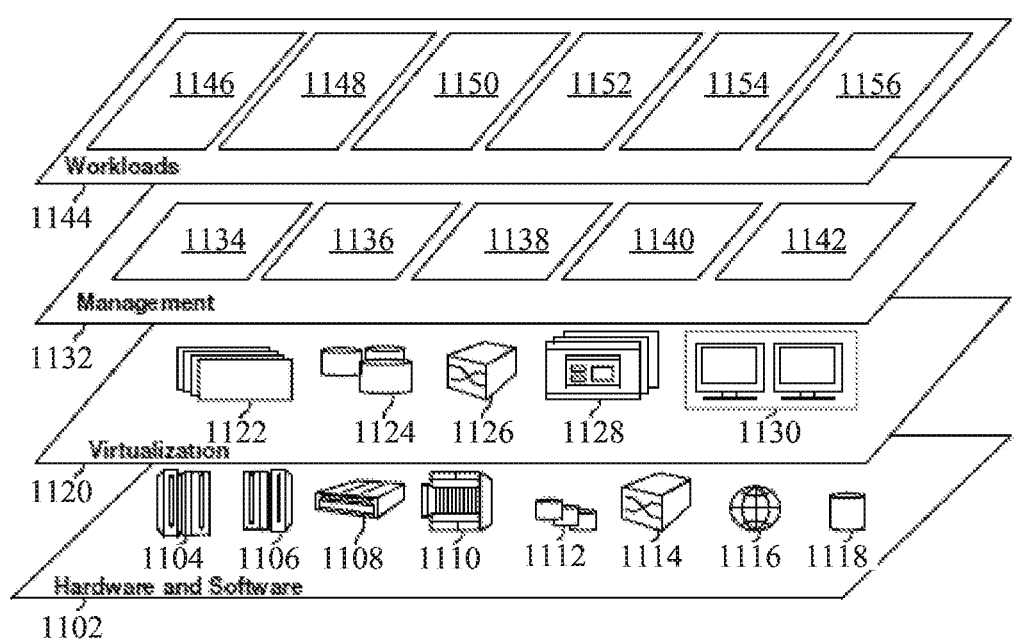
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and software development management 1156. Various embodiments of the present invention can utilize the cloud computing environment described with reference to FIGS. 10 and 11 to manage one or more software application build processes so as to prevent the implementation of one or more unauthorized changes (e.g., version updates) during development of a computer program application (e.g., a microservice application).

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
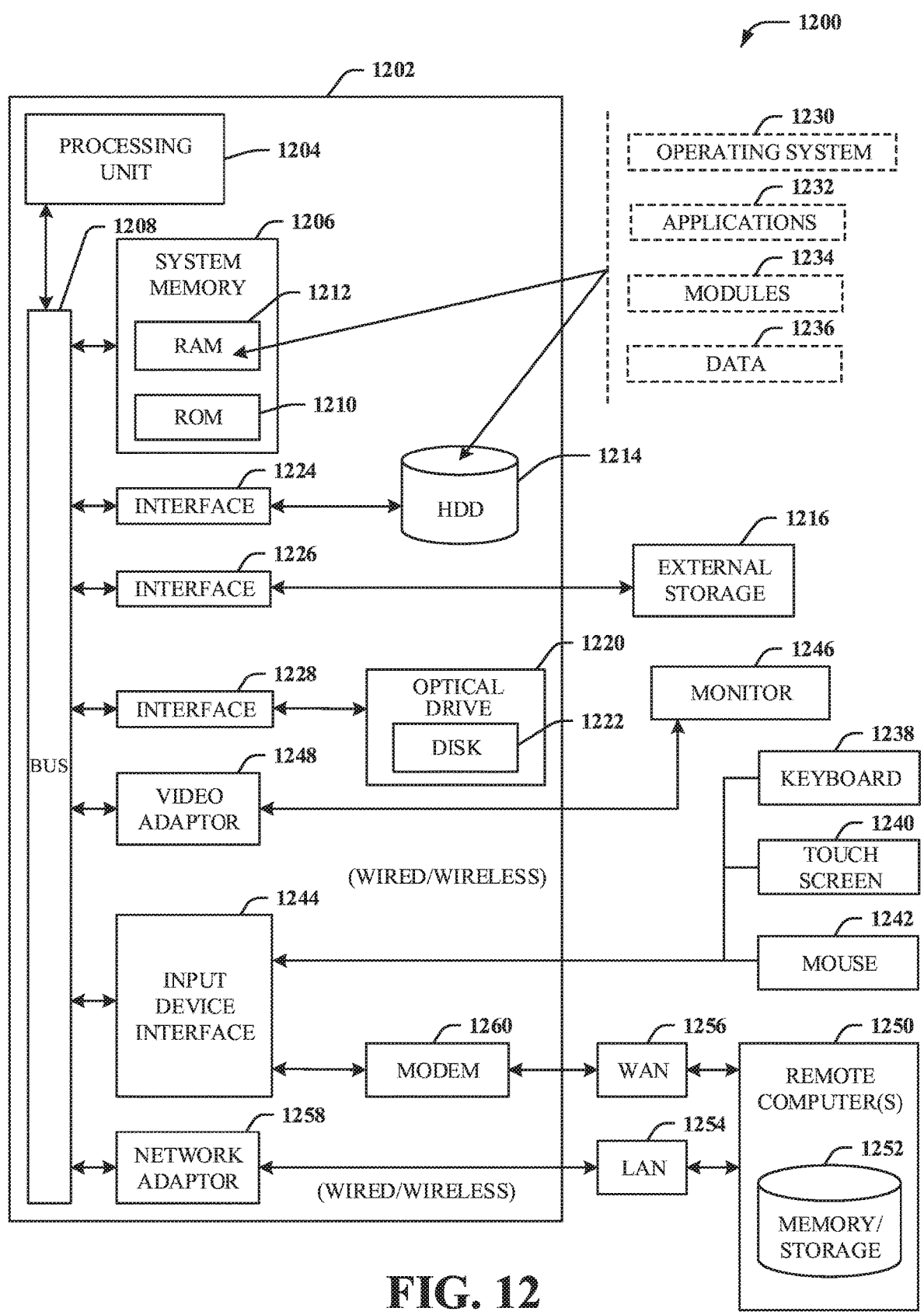
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor, operably coupled to the memory, and that executes the computer executable components stored in the memory, wherein the computer executable components comprise:
        a control component that executes a freeze algorithm that controls modification of a software artifact within a software application build set, wherein the freeze algorithm prevents implementation of a change to the software artifact by a version control program by pinning the software application build set to a defined version of an operating system, in command code that controls implementation of the software application build set; and
        an integration component that, in response to determining that the change to the software artifact meets a vulnerability criterion, integrates the change to the software artifact into the software application build set.

2. The system of claim 1, wherein the change to the software artifact is an update generated by the version control program, and wherein the freeze algorithm prevents the update from being incorporated into the software application build set.

3. The system of claim 1, wherein the freeze algorithm further prevents the implementation of the change to the software artifact by at least one function selected from a group consisting of adding a hash function associated with a base image of the software application build set to the command code and adding a Boolean expression to the command code.

4. The system of claim 1, further comprising:
    an identification component that analyzes the software application build set to identify the software artifact; and
    a monitor component that monitors a source of the software artifact to detect the change generated by the version control program.

5. The system of claim 4, further comprising:
    an audit component that generates an audit log based on whether the change to the software artifact addresses a vulnerability in the software artifact.

6. The system of claim 5, further comprising:
    an analysis component that evaluates the software artifact based on at least one defined threshold selected from a group consisting of a security requirement and a compliance requirement.

7. The system of claim 6, wherein the vulnerability in the software artifact is based on the security requirement.

8. A computer-implemented method, comprising:
    executing, by a system operatively coupled to a processor, a freeze algorithm that controls modification of a software artifact within a software application build set, wherein the freeze algorithm prevents implementation of a change to the software artifact by a version control program by pinning the software application build set to a defined version of an operating system, in command code that controls implementation of the software application build set; and
    in response to determining that the change to the software artifact meets a vulnerability criterion, integrating, by the system, the change to the software artifact into the software application build set.

9. The computer-implemented method of claim 8, wherein the change to the software artifact is an update generated by the version control program, and wherein the freeze algorithm prevents the update from being incorporated into the software application build set.

10. The computer-implemented method of claim 8, wherein the freeze algorithm further prevents the implementation of the change to the software artifact by at least one function selected from a group consisting of adding a hash function associated with a base image of the software application build set to the command code and adding a Boolean expression to the command code.

11. The computer-implemented method of claim 8, further comprising:
    analyzing, by the system, the software application build set to identify the software artifact; and
    monitoring, by the system, a source of the software artifact to detect the change generated by the version control program.

12. The computer-implemented method of claim 11, further comprising:
    generating, by the system, an audit log based on whether the change to the software artifact addresses a vulnerability in the software artifact.

13. The computer-implemented method of claim 12, further comprising:
    evaluating, by the system, the software artifact based on at least one defined threshold selected from a group consisting of a security requirement and a compliance requirement.

14. The computer-implemented method of claim 13, wherein the vulnerability in the software artifact is based on the security requirement.

15. A computer program product for preventing unauthorized packages from being embedded into a software application build process, the computer program product comprising a computer readable storage medium having program instructions embodied therewith, the program instructions executable by a processor to cause the processor to:
    execute, by the processor, a freeze algorithm that controls modification of a software artifact within a software application build set, wherein the freeze algorithm prevents implementation of a change to the software artifact by a version control program by pinning the software application build set to a defined version of an operating system, in command code that controls implementation of the software application build set; and in response to determining that the change to the software artifact meets a vulnerability criterion, integrating, by the system, the change to the software artifact into the software application build set.

16. The computer program product of claim 15, wherein the freeze algorithm further prevents the implementation of the change to the software artifact by at least one function selected from a group consisting of adding a hash function associated with a base image of the software application build set to the command code and adding a Boolean expression to the command code.

17. The computer program product of claim 15, wherein the program instructions further cause the processor to:
analyze, by the processor, the software application build set to identify the software artifact; and
monitor, by the processor, a source of the software artifact to detect the change generated by the version control program.

18. The computer program product of claim 16, wherein the program instructions further cause the processor to:
evaluate, by the processor, the software artifact based on at least one defined threshold selected from a group consisting of a security requirement and a compliance requirement.

19. The computer program product of claim 18, wherein the program instructions further cause the processor to:
generate, by the processor, an audit log based on whether the change to the software artifact addresses a vulnerability in the software artifact.

20. The computer program product of claim 19, wherein the vulnerability in the software artifact is based on the security requirement.

* * * * *